(12) United States Patent
Takeshita

(10) Patent No.: US 9,311,418 B2
(45) Date of Patent: Apr. 12, 2016

(54) INFORMATION PROCESSING APPARATUS, INFORMATION PROCESSING METHOD, INFORMATION MANAGEMENT APPARATUS, INFORMATION MANAGEMENT METHOD, RECORDING MEDIUM, AND INFORMATION PROCESSING SYSTEM

(71) Applicant: Sony Corporation, Tokyo (JP)

(72) Inventor: Naotaka Takeshita, Tokyo (JP)

(73) Assignee: Sony Corporation (JP)

( * ) Notice: Subject to any disclaimer, the term of this patent is extended or adjusted under 35 U.S.C. 154(b) by 500 days.

(21) Appl. No.: 13/713,547

(22) Filed: Dec. 13, 2012

(65) Prior Publication Data

US 2014/0172860 A1 Jun. 19, 2014

(51) Int. Cl.
*G06F 17/30* (2006.01)
(52) U.S. Cl.
CPC .............................. *G06F 17/30873* (2013.01)
(58) Field of Classification Search
CPC ..................................................... G06F 19/32
USPC .................................. 707/E17.005, 621, 736
See application file for complete search history.

(56) References Cited

U.S. PATENT DOCUMENTS

| 2012/0124136 A1* | 5/2012 | Kim et al. ...................... 709/204 |
| 2012/0246029 A1* | 9/2012 | Ventrone .................... 705/26.63 |
| 2014/0101248 A1* | 4/2014 | Felder et al. .................. 709/204 |

FOREIGN PATENT DOCUMENTS

JP 2009-140453 A 6/2009

* cited by examiner

*Primary Examiner* — Baoquoc To
(74) *Attorney, Agent, or Firm* — Lerner, David, Littenberg, Krumholz & Mentlik, LLP

(57) ABSTRACT

An information processing apparatus includes a collection information obtaining unit configured to collect information stored in a plurality of apparatuses so as to obtain collection information assigned to predetermined category groups, and a display controller configured to control display of the collection information. The category groups include first and second category groups. The display controller controls display of an image including a first category group display region which displays categories of the first category group, a second category group display region which displays categories of the second category group, and a content display region which displays concrete content of the collection information which corresponds to one of the categories selected in the first category group and which corresponds to one of the categories selected in the second category group.

28 Claims, 12 Drawing Sheets i) COMPANY CATEGORIES
  FASHION, HOUSEHOLD GOODS/INTERIOR, RESTAURANTS/FOODS/DRINKS, HEALTH/BEAUTY, TRAVEL/TRANSPORTATION, AND MUSIC/TV/MOVIES/BOOKS AND MAGAZINES ii) COMPANY NAMES iii) PROMOTION CATEGORIES
  RELEASE INFORMATION(NEW PRODUCT/NEW SERVICE), EVENT INFORMATION, SALE INFORMATION, CAMPAIGN INFORMATION, AND COUPON INFORMATION iv) DATE AND TIME INFORMATION v) LOCATION INFORMATION vi) USER ATTRIBUTES

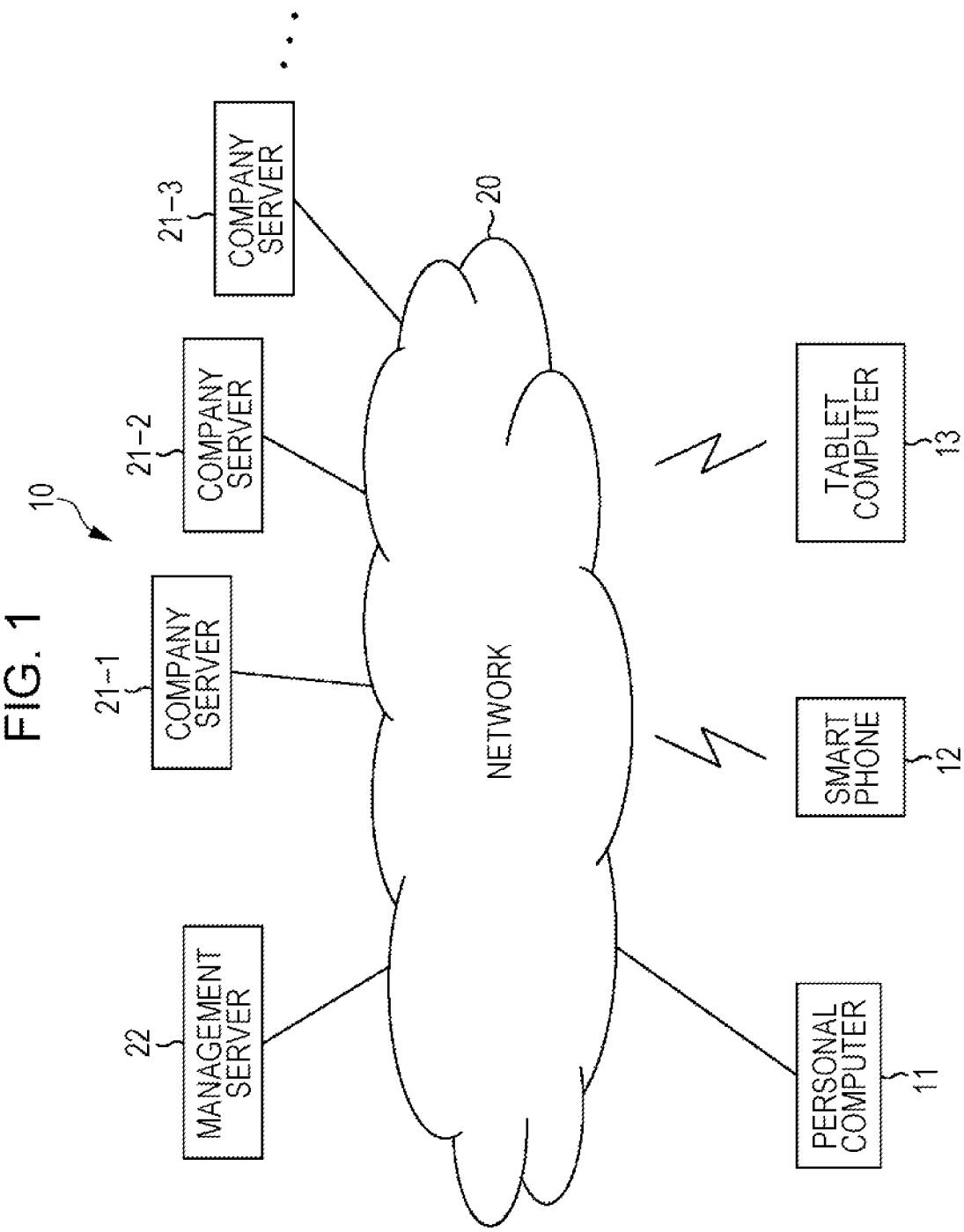

FIG. 2 i) FAVORITE COMPANIES
ii) CATEGORIES OF FAVORITE COMPANIES
iii) SUITABLE PROMOTION CATEGORIES
iv) ATTRIBUTES (GENDER, AGE, AND LIVING AREA)

FIG. 3 i) COMPANY CATEGORIES
   FASHION, HOUSEHOLD GOODS/INTERIOR, RESTAURANTS/FOODS/DRINKS, HEALTH/BEAUTY, TRAVEL/TRANSPORTATION, AND MUSIC/TV/MOVIES/BOOKS AND MAGAZINES
ii) COMPANY NAMES
iii) PROMOTION CATEGORIES
   RELEASE INFORMATION (NEW PRODUCT/NEW SERVICE), EVENT INFORMATION, SALE INFORMATION, CAMPAIGN INFORMATION, AND COUPON INFORMATION
iv) DATE AND TIME INFORMATION
v) LOCATION INFORMATION
vi) USER ATTRIBUTES i) LIST OF FAVORITE COMPANIES AND THE NUMBER OF FAVORITE COMPANIES ii) LIST OF CATEGORIES OF FAVORITE COMPANIES iii) SELECTED PROMOTION CATEGORY iv) ATTRIBUTES (GENDER, AGE, AND LIVING AREA)

v) STATES OF ACCESSES TO INFORMATION vi) STATES OF ACCESSES TO COMPANY SERVERS vii) DATE AND TIME OF REGISTRATION IN SCHEDULER viii) DATE AND TIME OF POSTING TO SOCIAL MEDIA

INFORMATION PROCESSING APPARATUS, INFORMATION PROCESSING METHOD, INFORMATION MANAGEMENT APPARATUS, INFORMATION MANAGEMENT METHOD, RECORDING MEDIUM, AND INFORMATION PROCESSING SYSTEM

BACKGROUND

The present technique relates to information processing apparatuses, information processing methods, information management apparatuses, information management methods, recording media, and information processing systems, and particularly relates to an information processing apparatus, an information processing method, an information management apparatus, and information management method, a recording medium, and an information processing system which are capable of facilitating enhancement of contacts with customers.

In general, companies transmit information to customers by sending mail magazines. For example, information on events and information on new products are included in such a mail magazine and transmitted to users (customers) who subscribe to the mail magazine.

In recent years, as an application program for electronic apparatuses such as personal computers, smart phones, and tablet computers, a scheduler has been widely used.

In particular, business persons have a number of opportunities to activate schedulers and display screens of the schedulers in electronic apparatuses. Therefore, the companies pay attention to the schedulers as important tools for enhancing contacts with customers, for example.

Furthermore, when an image associated with a schedule registered in such a scheduler is registered afterward, the image is displayed in the scheduler (refer to Japanese Unexamined Patent Application Publication No. 2009-140453).

Furthermore, in recent years, social media has become popular. The social media realizes bidirectional conversation among a number of people and organizations by showing content including transmitted text, images, and sound to persons and organizations who belong to a predetermined community service using techniques based on the Internet.

Therefore, the companies also pay attention to the social media as important tools for enhancing contacts with customers, for example.

SUMMARY

However, in a case where a mail address registered by a user is changed, the user does not receive mail magazines until a new mail address is registered.

Furthermore, in recent years, a function of filtering so-called junk mails has been developed for electronic apparatuses including personal computers, smart phones, and tablet computers. Therefore, mail magazines from companies may be filtered as junk mails without the companies and the users noticing.

Furthermore, since different methods for describing information included in mail magazines are employed by different companies, it is difficult for a user who subscribes to different mail magazines, for example, to select important information. For example, the user checks description content of the mail magazines, makes a note on the description content, and registers dates and times of events in a scheduler.

It is desirable to facilitate enhancement of contacts with customers.

According to an embodiment of the present technique, there is provided an information processing apparatus including a collection information obtaining unit configured to collect information stored in a plurality of apparatuses so as to obtain collection information assigned to predetermined category groups, and a display controller configured to control display of the collection information. The category groups include first and second category groups. The display controller controls display of an image including a first category group display region which displays categories of the first category group, a second category group display region which displays categories of the second category group, and a content display region which displays concrete content of the collection information which corresponds to one of the categories selected in the first category group and which corresponds to one of the categories selected in the second category group.

A mark specifying the selected category in the first category group and a mark specifying the selected category in the second category group may be included in the image displayed by the display controller.

The collection information may include information representing a location. The display controller may further control display of an image including a category display region which displays the categories of the first category group or the categories of the second category group, a geographic range display region which displays a geographic range associated with the information on the location included in the collection information, a map display region which displays a map which clearly specifies a position corresponding to the information on the location included in the collection information in the geographic range, and a location oriented content display region which displays concrete content of the collection information which corresponds to the selected category in the first category group or the second category group and which corresponds to the location clearly specified in the map.

The collection information may include information representing a time. The display controller may further control display of an image including a category display region which displays the categories of the first category group or the categories of the second category group, a time range display region which displays a time range associated with the information on the time included in the collection information, and a time oriented content display region which displays concrete content of the collection information which corresponds to the selected category in the first category group or the second category group and which includes the information on the time included in the time range.

The content display region may display concrete content of a plurality of collection information items. When one of the plurality of collection information items displayed in the content display region is selected, the display controller may further display detail of the selected collection information item.

The detail of the collection information item may include information specifying an apparatus of a transmission source of the collection information item.

The content display region may display concrete content of a plurality of collection information items, and GUIs used to display functions of utilizing the collection information items may be displayed with the concrete content of the plurality of collection information items.

When one of the GUIs is operated, a corresponding one of the collection information items in which the concrete content is being displayed with the GUI may be registered in a scheduler.

When one of the GUIs is operated, a corresponding one of the collection information items in which the concrete content is being displayed with the GUI may be posted to social media.

When one of the GUIs is operated, information specifying content of the operation and feedback information including information specifying a user of the information processing apparatus may be transmitted through a network.

The collection information may include information representing user attributes. The collection information obtaining unit may further obtain collection information selected in accordance with the attributes. The display controller may further control display of an image including a region which displays the collection information selected in accordance with the attributes.

The display controller may further control display of an image including a region which displays information associated with collection information obtained by information processing apparatuses of other users.

The collection information may be categorized according to transmission sources in the first category group, and the collection information may be categorized according to content of the collection information in the second category group.

According to another embodiment of the present technique, there is provided an information processing method including collecting information stored in a plurality of apparatuses so as to obtain collection information assigned to predetermined category groups, and controlling display of the collection information. The category groups include first and second category groups. Display of an image including a first category group display region which displays categories of the first category group, a second category group display region which displays categories of the second category group, and a content display region which displays concrete content of the collection information which corresponds to one of the categories selected in the first category group and which corresponds to one of the categories selected in the second category group is controlled.

According to still another embodiment of the present technique, there is provided a recording medium which records a program causing a computer to function as an information processing apparatus. The information processing apparatus includes a collection information obtaining unit configured to collect information stored in a plurality of apparatuses so as to obtain collection information assigned to predetermined category groups, and a display controller configured to control display of the collection information. The category groups include first and second category groups. The display controller controls display of an image including a first category group display region which displays categories of the first category group, a second category group display region which displays categories of the second category group, and a content display region which displays concrete content of the collection information which corresponds to one of the categories selected in the first category group and which corresponds to one of the categories selected in the second category group.

Accordingly, information stored in a plurality of apparatuses is collected so as to obtain collection information assigned to predetermined category groups, and display of the collection information is controlled. The category groups include first and second category groups. Display of an image including a first category group display region which displays categories of the first category group, a second category group display region which displays categories of the second category group, and a content display region which displays concrete content of the collection information which corresponds to one of the categories selected in the first category group and which corresponds to one of the categories selected in the second category group is controlled.

According to a yet another embodiment of the present technique, there is provided an information management apparatus including a collection information generation unit configured to generate collection information which is to be transmitted to a plurality of user terminals, which is obtained by collecting information stored in a plurality of apparatuses, and which is assigned to predetermined first and second category groups, and a transmission unit configured to transmit the collection information to the user terminals in accordance with information specifying categories of the first category group and categories of the second category group which are associated with user IDs used to specify users of the user terminals.

According to a further embodiment of the present technique, there is provided an information management method including generating collection information which is to be transmitted to a plurality of user terminals, which is obtained by collecting information stored in a plurality of apparatuses, and which is assigned to predetermined first and second category groups, and transmitting the collection information to the user terminals in accordance with information specifying categories of the first category group and categories of the second category group which are associated with user IDs used to specify users of the user terminals.

According to a still further embodiment of the present technique, there is provided a recording medium which records a program causing a computer to function as an information processing apparatus. The information processing apparatus includes a collection information generation unit configured to generate collection information which is to be transmitted to a plurality of user terminals, which is obtained by collecting information stored in a plurality of apparatuses, and which is assigned to predetermined first and second category groups, and a transmission unit configured to transmit the collection information to the user terminals in accordance with information specifying categories of the first category group and categories of the second category group which are associated with user IDs used to specify users of the user terminals.

Accordingly, collection information which is to be transmitted to a plurality of user terminals, which is obtained by collecting information stored in a plurality of apparatuses, and which is assigned to predetermined first and second category groups is generated, and the collection information is transmitted to the user terminals in accordance with information specifying categories of the first category group and categories of the second category group which are associated with user IDs used to specify users of the user terminals.

According to a yet further embodiment of the present technique, there is provided an information processing system including an information management apparatus and a user terminal. The information management apparatus includes a collection information generation unit configured to generate collection information which is to be transmitted to a plurality of user terminals, which is obtained by collecting information stored in a plurality of apparatuses, and which is assigned to predetermined first and second category groups, and a transmission unit configured to transmit the collection information to the user terminals in accordance with information specifying categories of the first category group and categories of the second category group which are associated with user IDs used to specify users of the user terminals. The user terminal includes a collection information obtaining unit configured to collect information stored in a plurality of apparatuses so as to obtain collection information assigned to predetermined category groups, and a display controller configured to control display of the collection information. The category groups include first and second category groups. The display controller controls display of an image including a first category display region which displays categories of the first category group, a second category display region which displays categories of the second category group, and a content display region which displays concrete content of the collection information which corresponds to one of the categories selected in the first category group and which corresponds to one of the categories selected in the second category group.

According to the present technique, enhancement of contacts with customers is facilitated.

BRIEF DESCRIPTION OF THE DRAWINGS

FIG. 1 is a diagram illustrating a configuration of an information delivery system according to the present technique;

FIG. 2 is a diagram illustrating a configuration of registration information of a user ID;

FIG. 3 is a diagram illustrating a configuration of collection information;

DETAILED DESCRIPTION OF EMBODIMENTS

Figure 4:
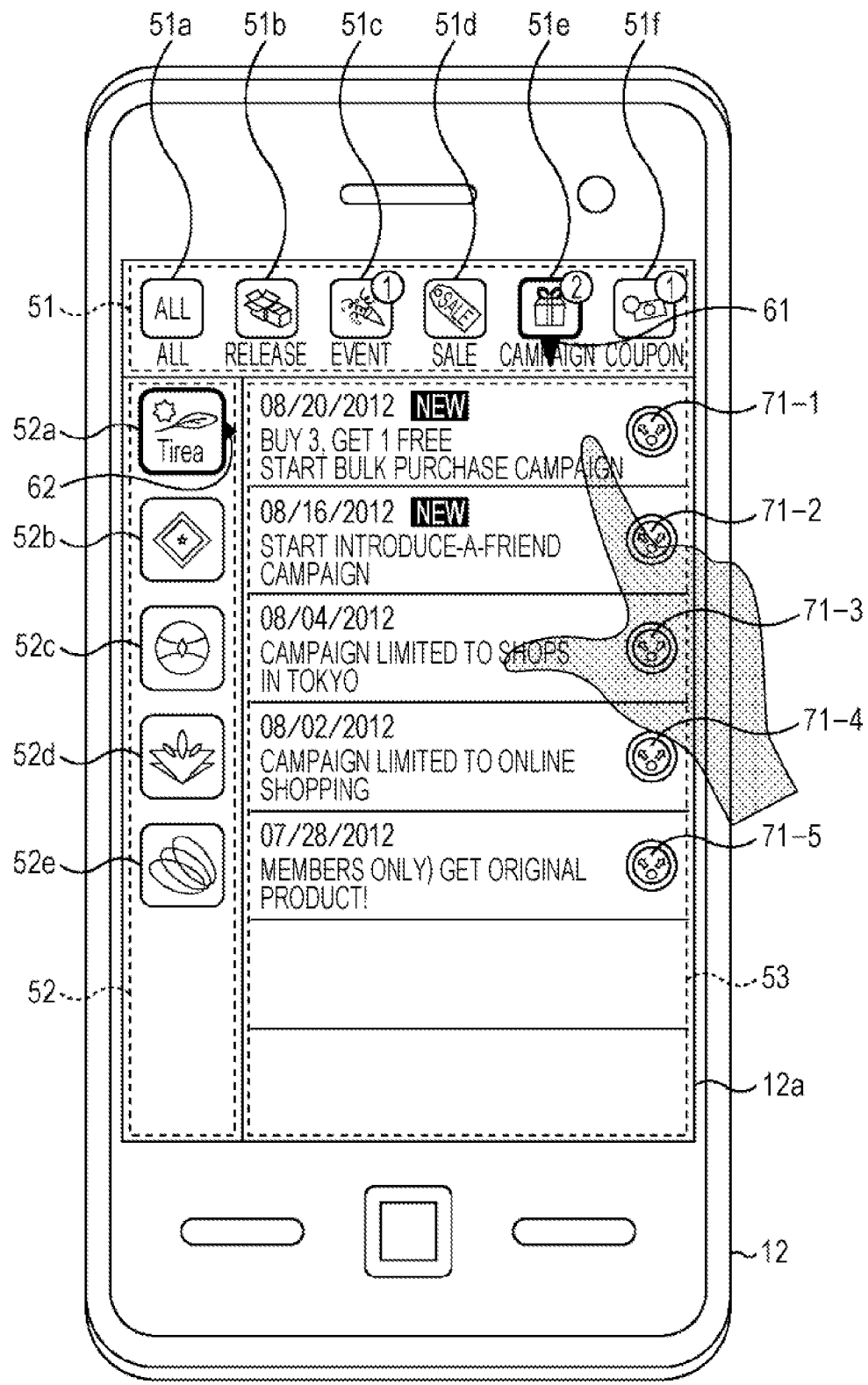
FIG. 4 is a diagram illustrating an image displayed in a screen of a user terminal which obtains the collection information.

An embodiment of the present technique will be described with reference to the accompanying drawings hereinafter.

FIG. 1 is a diagram illustrating a configuration of an information delivery system according to the present technique.

An information delivery system 10 illustrated in FIG. 1 includes a personal computer 11, a smart phone 12, a tablet computer 13, a network 20, company servers 21-1, 21-2, 21-3, and so on, and a management server 22.

Note that when the company servers 21-1, 21-2, 21-3, and so on are not distinguished from one another, the company servers 21-1, 21-2, 21-3, and so on are simply referred to as a company server 21. Furthermore, the personal computer 11, the smart phone 12, and the tablet computer 13 are small electronic apparatuses operated by users, and are collectively referred to as a user terminal.

In the information delivery system, when accessing the management server 22 through the network 20, the user terminal obtains information transmitted from companies.

It is assumed that the personal computer 11, the smart phone 12, and the tablet computer 13 are user terminals owned by users A, B, and C, respectively. User IDs used to obtain information from the management server 22 are assigned to the users A to C.

Different user IDs are assigned to different users. As user IDs for obtaining information from the management server 22, social media IDs may be used, for example. By this, the users are not requested to newly obtain IDs, and furthermore, when the social media IDs are used, it is less likely that the users forget the IDs.

Furthermore, before the user IDs are registered, attribute information and the like are set in the management server 22. FIG. 2 is a diagram illustrating registration information of a user ID. In the example of FIG. 2, "favorite companies", "categories of favorite companies", "suitable promotion categories", and "attributes (gender, age, living area)" are registered as the registration information.

It is assumed that the company servers 21-1, 21-2, and 21-3 are managed by a company A, a company B, and a company C, respectively. The company server 21 stores data representing web pages including information to be transmitted from the company which manages the server to customers (users). The company server 21 supplies the data representing the web pages to a user terminal, for example, when the user terminal accesses the company server 21.

It is assumed that the management server 22 is managed by an IT company (such as a company X), for example. The company X makes a contract with the companies A, B, C, and so on about information delivery and causes the management server 22 to copy a portion of the data representing the web pages of the company server 21. For example, the management server 22 periodically or at an arbitrary timing accesses the company server 21 through the network 20. Then the management server 22 copies data (normally, text data) corresponding to information which appears as "new arrival information" and "important notification", for example, among data included in the web pages.

Here, the data copied from the web pages of the company server 21 is analyzed as described below and stored in the management server 22 as collection information. Note that the collection information is stored after being associated with the company (company A, B, or C, for example) which manages the company server 21.

Furthermore, the management server 22 supplies the collection information to the user terminal which has accessed the management server 22 through the network 20. In this case, collection information stored while being associated with companies selected in accordance with "favorite companies" and "categories of favorite companies" which are registered by the user in advance is supplied.

Various application programs are installed in the user terminal.

The user terminal periodically accesses the management server 22 when a dedicated application for accessing the management server 22 which is installed in advance or a scheduler, for example, is activated so as to obtain the collection information. Alternatively, the user terminal accesses the management server 22 when a browser is activated at an arbitrary timing so as to obtain the collection information.

Furthermore, when the browser is activated, the user terminal may browse web pages by accessing the company server 21 or post articles by accessing social media.

Furthermore, the user terminal incorporates a GPS receiver which detects positional information (latitude and longitude) of the user terminal in accordance with GPS data obtained from satellites.

In this way, information transmitted from a company ("new arrival information" and "important notification", for example) is supplied to users.

Furthermore, the management server 22 distributes (supplies) the collection information to the user terminal such that the collection information is categorized.

For example, when the contract about information delivery is made with the companies A, B, C, and so on in advance, for example, categories of the companies are determined in accordance with the data of web pages of the companies. By this, the collection information is associated with the categories of the companies and further associated with the companies (companies A, B, and C, for example) before being stored.

Furthermore, the management server 22 divides the data copied from the web pages of the company server 21 into words by performing morphological analysis, for example, and determines whether a predetermined keyword is included in the words or determines appearance frequency of the keyword so as to assign the words into promotion categories. According to the promotion categories, the users recognize purposes of transmission of the collection information, for example. By this, the collection information is associated with company categories, further associated with the companies, and still further associated with the promotion categories before being stored.

Moreover, the management server 22 extracts information on a date and time, information on a location, and the like from the data copied from the web pages, and assigns information on user attributes representing attributes of a user to be transmitted to the information so as to generate the collection information.

FIG. 3 is a diagram illustrating the collection information. In the example of FIG. 3, the collection information includes "company categories", "company names", "promotion categories", "date and time information", "location information", and "user attributes".

The company categories represent categories of business of the companies which manage the company servers 21-1, 21-2, 21-3, and so on. In the example of FIG. 3, the company categories include elements of "fashion", "household goods/interior", "restaurants/foods/drinks", "health/beauty", "travel/transportation", and "music/TV/movies/books and magazines". For example, cosmetics makers are assigned to the company category of "health/beauty" and beer companies are assigned to the company category of "restaurants/foods/drinks".

The company names represent names of the companies which manage the company servers 21-1, 21-2, 21-3, and so on.

The promotion categories represent types of promotion represented by articles and text corresponding to the data copied from the web pages of the company server 21. In the example of FIG. 3, the promotion categories include elements of "release information (new products/new services)", "event information", "sale information", "campaign information", and "coupon information".

The date and time information represents date and times corresponding to content of the articles and the text corresponding to the data copied from the web pages of the company server 21. For example, when "release information (new products/new services)" is selected from the promotion categories, a date and time of release of a new product is represented by the date and time information. For example, "event information", "sale information", or "campaign information" is selected from the promotion categories, a starting date and time and an ending date and time of an event, sale, or a campaign are represented by the date and time information. Furthermore, when "coupon information" is selected from the promotion categories, an expiration date of a coupon or the like is represented by the date and time information.

The location information represents a location where the event, the sale, or the campaign is held, and is represented by an address or latitude and longitude, for example. Alternatively, the location information represents shops which allow the coupon to be used.

The user attributes represent information used to select users who may be interested in the collection information, for example. The user attributes include information on genders, information on ages, and information on living areas of the users who may be interested in the collection information, for example. The users who may be interested in the collection information may be selected by retrieving registration information of the users described with reference to FIG. 2 in accordance with the information. Alternatively, information representing registration content of "favorite companies" and "categories of favorite companies" may be included in the information included in user attributes.

As described above, the user terminal periodically accesses the management server 22 when the dedicated application for accessing the management server 22 which is installed in advance or the scheduler, for example, is activated so as to obtain the collection information. Alternatively, the user terminal accesses the management server 22 when the browser is activated at an arbitrary timing so as to obtain the collection information.

In this case, the user terminal obtains the collection information from the management server 22 in accordance with the registration content of "favorite companies" and "categories of favorite companies" included in the registration information corresponding to the user ID described with reference to FIG. 2. For example, a specific company name is described in "favorite companies" included in the registration information corresponding to the user ID and collection information corresponding to the specific company name is obtained. Furthermore, for example, one of the elements of "company categories" is described in "categories of favorite companies" included in the registration information corresponding to the user ID and collection information corresponding to the one of the elements of "company categories" is obtained.

Alternatively, the collection information may be obtained from the management server 22 in accordance with content of "user attributes" shown in FIG. 3.

By this, information which is transmitted by being disclosed by the companies in the web pages of the company server 21 is delivered to the users.

FIG. 4 is a diagram illustrating an image displayed in a screen of the user terminal which obtains the collection information. Here, as an example, an image displayed in a display 12*a* of the smart phone 12 is illustrated. FIG. 4 shows an example of an image displayed by a dedicated application program for displaying and managing the collection information, for example.

In this example, the image displayed in the display 12*a* is divided into regions 51 to 53.

In the region 51, icons corresponding to the promotion categories described above are displayed. In this embodiment, icons 51*b* to 51*f* corresponding to the promotion categories "release information", "event information", "sale information", "campaign information", and "coupon information", respectively, and an icon 51*a* corresponding to all the promotion categories are displayed.

To the icons 51*c*, 51*e*, and 51*f*, numbers surrounded by circles are assigned and the numbers represent the numbers of "new arrival information" included in the collection information which belong to the promotion categories.

Furthermore, in the example of FIG. 4, a mark 61 is assigned to the icon 51*e*. The mark 61 represents that the collection information displayed in the region 53 belongs to the promotion category "campaign information".

In the region 52, company icons are displayed. Here, the company icons correspond to names of companies included in "company names" illustrated in FIG. 3, for example, and are stored in advance. In this example, icons 52*a* to 52*e* are displayed.

Furthermore, in the example of FIG. 4, a mark 62 is assigned to the icon 52*a*. The mark 62 represents that the collection information displayed in the region 53 is transmitted from a company corresponding to the icon 52*a* (company A, for example).

In the region 53, concrete content of the collection information is displayed. For example, articles, text, and the like corresponding to the data copied from the web pages of the company server 21 by the management server 22 are displayed in the region 53. In this example, five collection information items are displayed in the region 53.

In the case of FIG. 4, among information items transmitted from the company A, campaign information is displayed in the region 53.

Furthermore, among the collection information items displayed in the region 53 of FIG. 4, text "new" is assigned to first and second collection information items from the top. The text "new" represents that information is newly arrived.

When a user clicks the icon 51*f*, for example, information which is transmitted from the company A and which is assigned to the promotion category "coupon information" is displayed in the region 53. In this case, only one new arrival information item to which the text "new" is assigned is included in collection information items.

Furthermore, in FIG. 4, buttons 71-1 to 71-5 are assigned to the five collection information items displayed in the region 53. The individual buttons 71-1 to 71-5 are GUIs representing functions of utilizing the collection information items displayed in the region 53. When one of the buttons 71-1 to 71-5 is pressed, for example, a word balloon illustrated in FIG. 5 is displayed.

Figure 5:
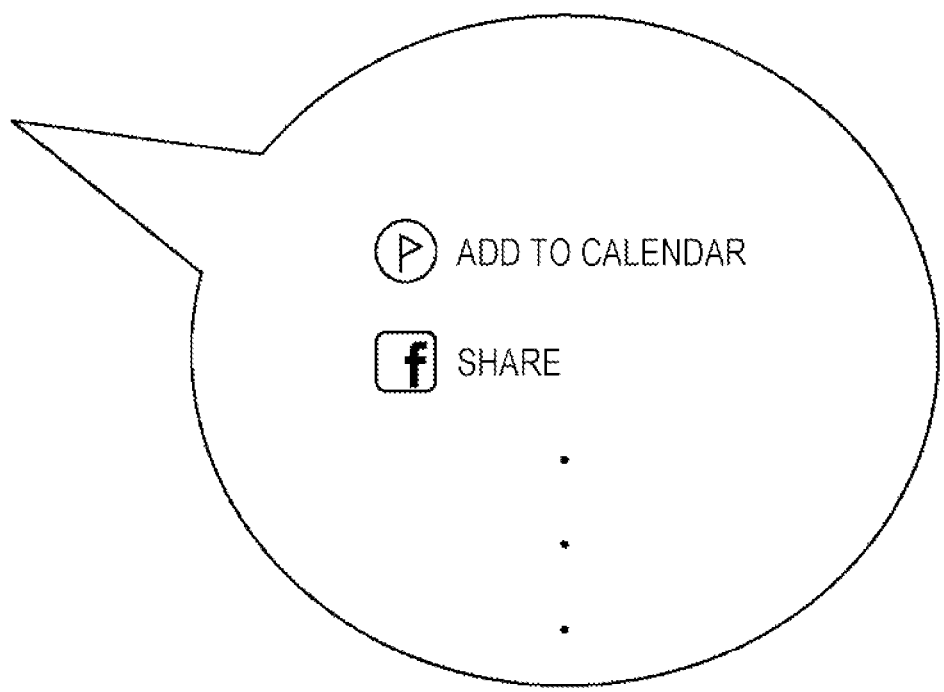
FIG. 5 is a diagram illustrating an image which displays a function of utilizing the collection information.

In the example of FIG. 5, an icon with text "add to calendar" and an icon with text "share" are displayed.

For example, the button 71-1 is clicked and the icon with the text "add to calendar" is clicked, the first collection information items displayed in the top of the region 53 of FIG. 4 is registered as a schedule in a certain day (in this case, Aug. 20, 2012) in the scheduler.

Furthermore, when the button 71-1 is clicked and the icon with the text "share" is clicked, for example, the first collection information displayed in the top of the region 53 of FIG. 4 is posted to the social media.

For example, when the collection information item is registered in the certain day of the scheduler, or posted to the social media, information representing the registration or the posting is transmitted from the smart phone 12 to the management server 22.

Specifically, a way of utilizing the collection information item by the user terminal is fed back to the management server 22. The way of utilizing the collection information item by the user terminal may be stored after being associated with the user ID and may be used in marketing, for example.

In the example of FIG. 4, the case where the collection information items corresponding to the company icons displayed in the region 52 are displayed is described. However, collection information items which are associated with times and locations may be displayed.

Figure 6:
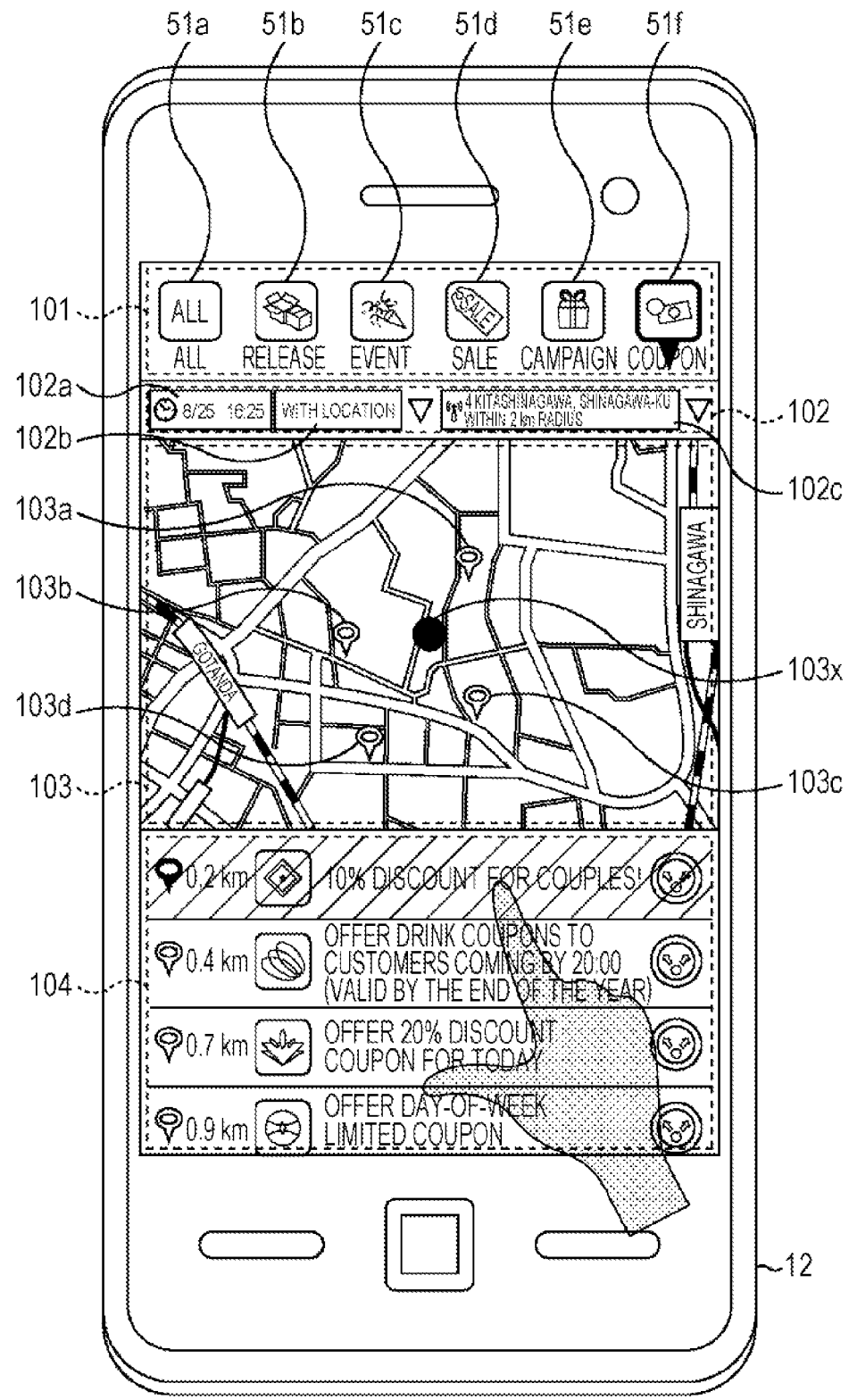
FIG. 6 is a diagram illustrating another image displayed in the screen of the user terminal which obtains the collection information.

FIG. 6 is a diagram illustrating another image displayed in the screen of the user terminal which obtains the collection information and corresponds to a case where the collection information associated with locations is displayed. Here, as an example, an image displayed in the display 12*a* of the smart phone 12 is illustrated. FIG. 6 shows an example of an image displayed by the dedicated application program for displaying and managing the collection information, for example.

In this example, the image displayed in the display 12*a* is divided into regions 101 to 104.

In the example of FIG. 6, in the region 101, the icons corresponding to the promotion categories described above are displayed. The region 101 is the same as the region illustrated in FIG. 4, and in this case, the icon corresponding to "coupon information" is marked.

In the region 102, information requested when the collection information associated with times or locations is displayed is displayed.

In this example, in a small region 102*a* of the region 102, a current date and time (8/25, 16:25) is displayed.

Furthermore, in a small region 102*b* of the region 102, text "with location" is displayed. The small region 102*b* is a GUI capable of displaying a pull-down menu, for example, and the text "with location" or text "with time" is selected by clicking the small region 102*b*.

Furthermore, in a small region 102*c* of the region 102, a current address and a geographical display range are displayed. In this example, text "4 Kitashinagawa, Shinagawa-ku" represents a current position of the smart phone 12 detected by a GPS function of the smart phone 12. Furthermore, in this example, text "within 2 km radius" represents the geographical display range and represents that a map in a range within 2 km radius from the current position and collection information associated with coupons which are allowed to be used in shops and the like within the range are displayed.

Note that the current address shown in the small region 102*c* is automatically changed in accordance with a current position of the smart phone 12 and the geographical display range shown in the small region 102*c* is changed by a user's operation. For example, the user may change the geographical display range to "within 4 km radius", "within 8 km radius", or the like.

In the region 103, a map is displayed. In FIG. 6, a mark 103*x* displayed in substantially the center of the region 103 represents a current position in the map. Marks 103*a* to 103*d* represent positions of shops and the like where the coupons of the collection information displayed in the region 104, which will be described hereinafter, are allowed to be used.

Note that the marks 103*a* to 103*d* are displayed in different colors, for example, so that correspondence relationships between the marks 103*a* to 103*d* and the collection information displayed in the region 104, which will be described hereinafter, are clearly recognized.

In the region 104, concrete content of the collection information is displayed. For example, articles, text, and the like corresponding to the data copied from the web pages of the company server 21 by the management server 22 are displayed in the region 104. In this example, four collection information items are displayed in the region 104.

In the example of FIG. 6, marks which are the same as the marks 103a to 103d and distances from the current position are displayed on the left end of the concrete content of the collection information items displayed in the region 104. For example, the mark displayed on the left end of a first collection information item is displayed in a color which is the same as a color of the mark 103a, and the mark displayed on the left end of a second collection information item is displayed in a color which is the same as a color of the mark 103b. The marks displayed with third and fourth collection information items are displayed in colors which are the same as colors of the marks 103c and 103d, respectively.

Furthermore, the distances from the current position which are displayed on the left side of the concrete content of the collection information items displayed in the region 104 represent distances from the current position to locations of shops and the like where the coupons of the collection information items are allowed to be used.

Furthermore, in the region 104, the company icons are displayed on the right side of the distances from the current position. The company icons correspond to the companies which transmit the collection information items.

Furthermore, in the region 104, buttons are displayed on the right side of the concrete content of the collection information items. As with the button 71-1 and the like shown in FIG. 4, these buttons are GUIs used to display functions of utilizing the collection information items displayed in the region 104.

In the foregoing description, the case where the map is displayed while the geographical display range is specified using the current position of the user terminal as a reference has been described. However, the map is displayed while the geographical display range may be specified using another position as a reference.

Note that, although the icons corresponding to the promotion categories are displayed in the region 101 of FIG. 6 in the foregoing description, the company icons may be displayed in the region 101, for example.

Figure 7:
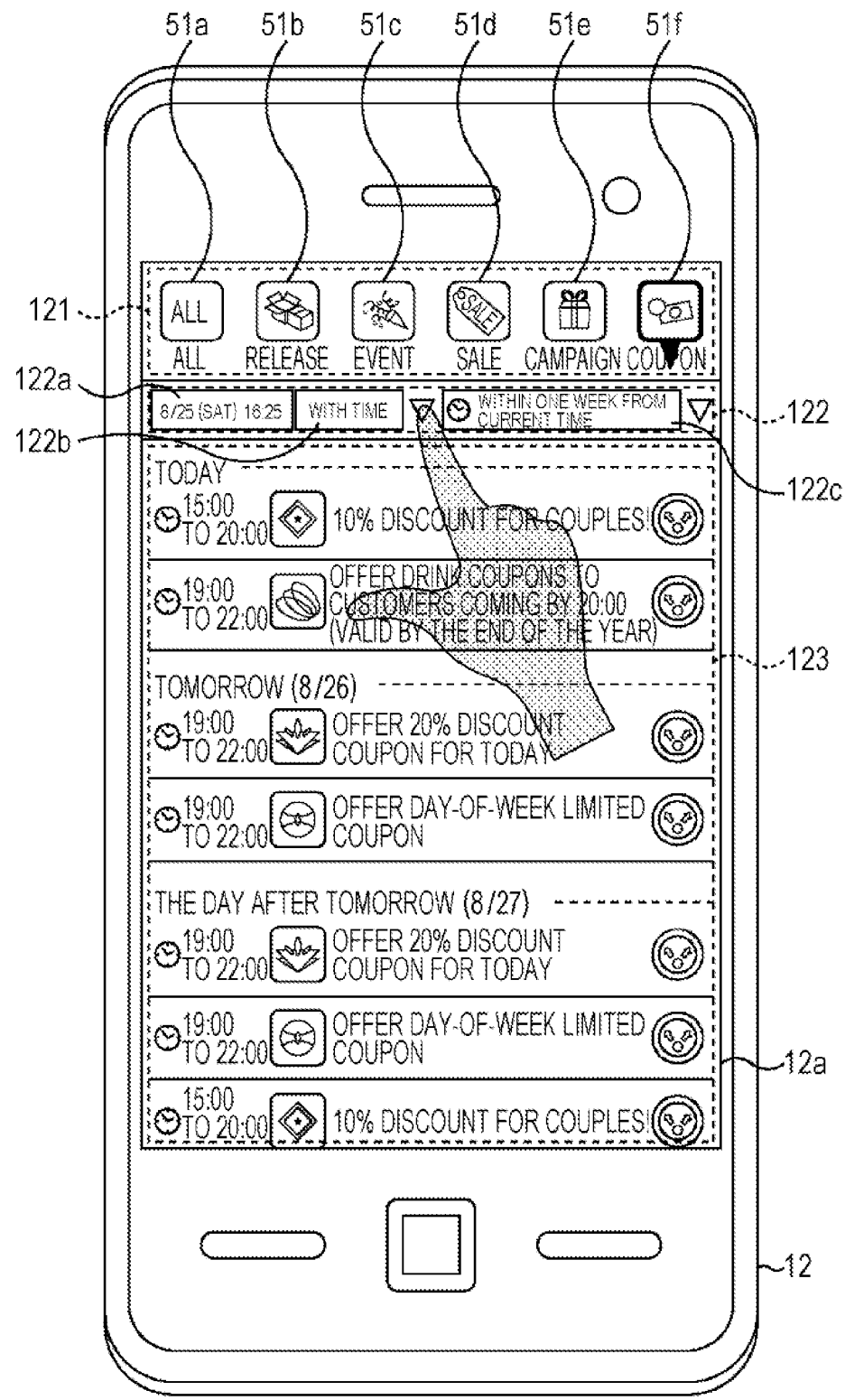
FIG. 7 is a diagram illustrating a further image displayed in the screen of the user terminal which obtains the collection information.

FIG. 7 is a diagram illustrating a further image displayed in the screen of the user terminal which obtains collection information and illustrating a case where the collection information associated with times are displayed. Here, as an example, an image displayed in the display 12a of the smart phone 12 is illustrated. FIG. 7 shows an example of an image displayed by the dedicated application program for displaying and managing the collection information, for example.

In this example, the image displayed in the display 12a is divided into regions 121 to 123.

In the example of FIG. 7, in the region 121, the icons corresponding to the promotion categories described above are displayed. The region 121 is the same as the region illustrated in FIG. 4, and in this case, the icon corresponding to "coupon information" is marked.

In the region 122, information requested when the collection information associated with times or locations is displayed is displayed.

In this example, in a small region 122a of the region 122, a current date and time (8/25, 16:25) is displayed.

Furthermore, in a small region 122b of the region 122, text "with time" is displayed. The small region 122b is a GUI capable of displaying a pull-down menu, for example, and the text "with location" or the text "with time" is selected by clicking the small region 122b.

Furthermore, in a small region 122c of the region 122, a time display range is displayed. In this example, text "within one week from current time" represents the time display range and represents that collection information associated with coupons which are valid within one week from a current time is displayed.

Note that the time display range in the small region 122c is changed by a user's operation. For example, the user may change the time display range to "within one day from a current time", "within 10 hours from a current time", or the like.

In the region 123, concrete content of the collection information is displayed. For example, articles, text, and the like corresponding to the data copied from the web pages of the company server 21 by the management server 22 are displayed in the region 123. In this example, seven collection information items are displayed in the region 123.

In the example of FIG. 7, periods of time in which the coupons are available are displayed on the left end of the concrete content of the collection information items displayed in the region 123. In this example, from the top of the region 123, a block of collection information items of coupons which are available "today", a block of collection information items of coupons which are available "tomorrow", and a block of collection information items of coupons which are available "the day after tomorrow" are displayed.

Furthermore, in the region 123, the company icons are displayed on the right side of the periods of time in which the coupons are available. The company icons correspond to companies which transmit the collection information items.

Furthermore, in the region 123, buttons are displayed on the right side of the concrete content of the collection information items. As with the button 71-1 and the like shown in FIG. 4, these buttons are GUIs used to display functions of utilizing the collection information items displayed in the region 123.

Note that, although the icons corresponding to the promotion categories are displayed in the region 121 of FIG. 7 in the foregoing description, the company icons may be displayed in the region 121, for example.

As described above, according to the present technique, information transmitted from various companies may be assigned to various categories and displayed.

Specifically, the user may easily obtain the information transmitted from the companies without accessing the company server 21 of the companies. Furthermore, the user may display the information transmitted from the companies in a state in which the information transmitted from the companies are assigned to the various categories so that the user easily recognizes content of the information transmitted from the companies. Furthermore, the user may easily utilize the information transmitted from the companies by registering the information in a corresponding day of the scheduler, by posting the information to the social media, and the like.

Figure 8:
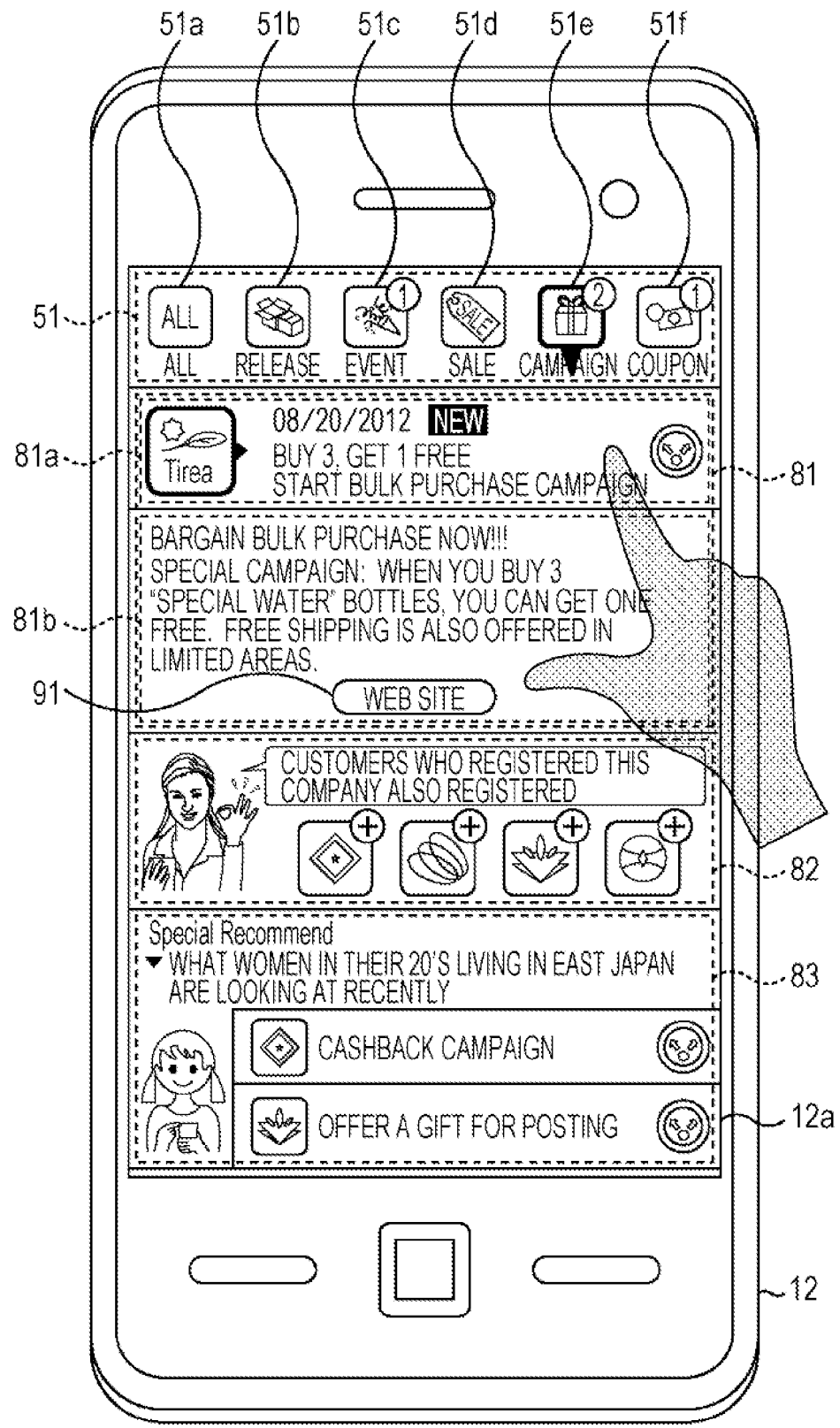
FIG. 8 is a diagram illustrating a still further image displayed in the screen of the user terminal which obtains the collection information.

FIG. 8 is a diagram illustrating an image displayed when the first collection information item displayed in the region 53 of FIG. 4 is clicked in a state in which the image of FIG. 4 is displayed.

In this example, the image displayed in the display 12a is divided into a region 51 and regions 81 to 83.

In the example of FIG. 8, as with the case of FIG. 4, in the region 51, the icons corresponding to the promotion categories are displayed.

In the region 81, concrete content of the clicked collection information item (the first collection information item in this case) among the collection information items displayed in the region 53 of FIG. 4 is displayed.

In a small region 81a of the region 81, content the same as that displayed in the region 53 of FIG. 4 is displayed. In a small region 81*b*, detailed information of the collection information item displayed in the small region 81*a* is displayed. Note that a button 91 is displayed in the small region 81*b*. When the button 91 is clicked, a web page of the company server 21 of a company corresponding to a transmission source of the collection information item (company A, for example) is accessed.

In the region 82, company icons corresponding to companies which are registered as favorite companies by other users who have registered the company A as a favorite company are displayed. By this, the user is caused to be interested in information transmitted from the other companies.

In the region 83, collection information which is selected by the management server 22 and which is especially recommended to the user of the smart phone 12 (special recommend) is displayed. Collection information corresponding to a gender, an age, and a living area included in user attributes described with reference to FIG. 3 which match a gender, an age, and a living area of the user is displayed in the region 83.

By displaying the information transmitted from the companies, usability for the users is further improved.

Note that the images illustrated in FIGS. 4, 6, 7, and 8 are examples of images displayed by the dedicated application program for displaying and managing collection information. However, such images may be displayed by the scheduler.

Figure 9:
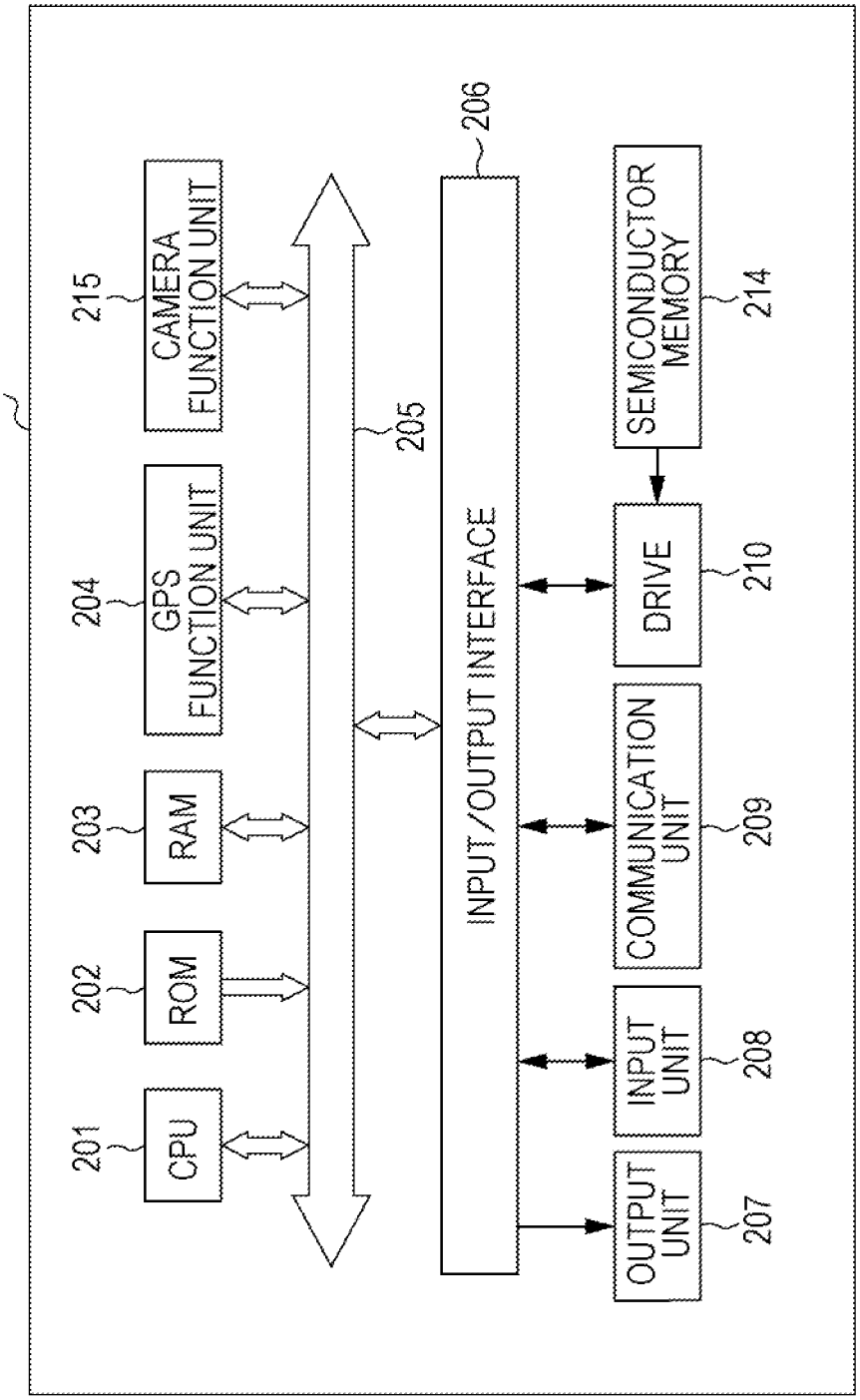
FIG. 9 is a block diagram illustrating a configuration of a smart phone illustrated in FIG. 1.

FIG. 9 is a block diagram illustrating a configuration of the smart phone 12 illustrated in FIG. 1.

In FIG. 9, an input/output interface 206 is connected to a CPU (Central Processing Unit) 201 through a bus 205.

When the user inputs an instruction using an input unit 208 including a touchpad and a keyboard through the input/output interface 206, the CPU 201 loads a program stored in a recording medium such as a ROM (Read Only Memory) 202 or a semiconductor memory 214 inserted into a drive 210 into a RAM (Random Access Memory) 203 and executes the program.

Furthermore, the CPU 201 outputs a result of the process to an output unit 207 including an LCD (Liquid Crystal Display) through the input/output interface 206 where appropriate, for example. A communication unit 209 performs wireless communication with predetermined access points, for example.

Furthermore, the smart phone 12 includes a GPS function unit 204 including a GPS receiver. The GPS function unit 204 detects positional information (latitude and longitude) in accordance with GPS data supplied from satellites.

Furthermore, the smart phone 12 includes a camera function unit 215. The camera function unit 215 including a CCD image sensor, a CMOS image sensor, and the like, captures an image corresponding to light collected through a lens, not shown, and outputs image data.

Note that this configuration is also applicable to the tablet computer 13 shown in FIG. 1, for example.

Figures 10, 11:
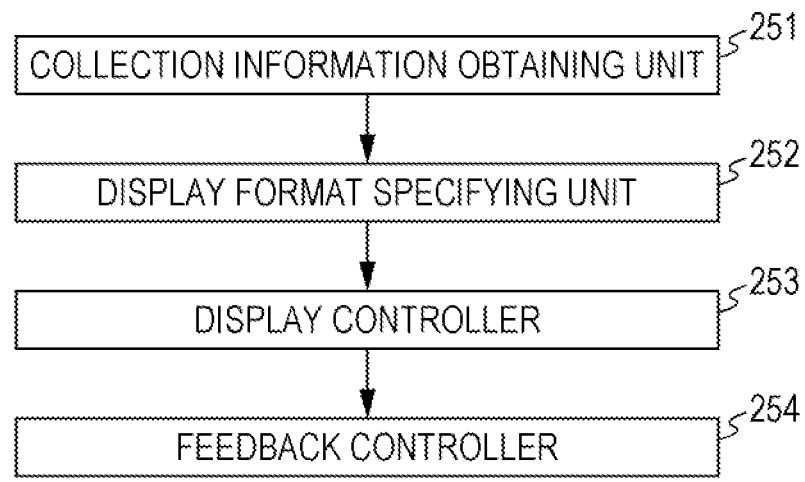
FIG. 10 is a block diagram illustrating a functional configuration of software such as programs to be executed by a CPU illustrated in FIG. 9.
FIG. 11 is a diagram illustrating a configuration of feedback information.

FIG. 10 is a block diagram illustrating a functional configuration of software such as programs to be executed by the CPU 201 illustrated in FIG. 9.

A collection information obtaining unit 251 periodically accesses the management server 22 and obtains collection information, for example.

A display format specifying unit 252 specifies a display format of the collection information obtained from the management server 22. The display format specifying unit 252 determines a format of the collection information to be displayed among the formats illustrated in FIGS. 4, 6, 7, and 8 in accordance with a user's operation, for example.

A display controller 253 controls display of the collection information displayed in the format specified by the display format specifying unit 252.

A feedback controller 254 stores operations associated with utilization of collection information (such as registration in the scheduler and posting to the social media). Then, the feedback controller 254 transmits information representing registration in the scheduler or information representing posting to the social media to the management server 22 as feedback information. Note that the feedback information includes the user ID.

Note that the feedback information may include more detailed information. For example, information illustrated in FIG. 11 may be included in the feedback information.

In the example of FIG. 11, a list of the favorite companies included in the registration information corresponding to the user ID of the user and the number of the favorite companies, and a list of the categories of favorite companies are illustrated as information included in the feedback information.

Furthermore, a promotion category corresponding to a display format immediately before the feedback information is transmitted (selected promotion category) is illustrated as information included in the feedback information. The promotion category corresponds to the icon to which the mark 61 is assigned in FIG. 4.

Furthermore, the attributes included in the registration information corresponding to the user ID of the user are illustrated as information included in the feedback information.

Furthermore, a state of access to the web pages of the company server 21 (the number of accesses per day, for example) is illustrated as information included in the feedback information. Note that, in this case, the company server 21 is managed by a company which has transmitted collection information which has been registered in the scheduler.

Furthermore, a date and time when collection information is registered in the scheduler and a date and time when the collection information is posted to the social media are illustrated as information included in the feedback information.

By storing and analyzing such feedback information, highly reliable marketing is realized.

Furthermore, the feedback information stored in the management server 22 may be supplied to the company server 21.

Here, although the registration in the scheduler and the posting to the social media are described as examples of the utilization of the collection information, the utilization of the collection information is not limited to these.

Figure 12:
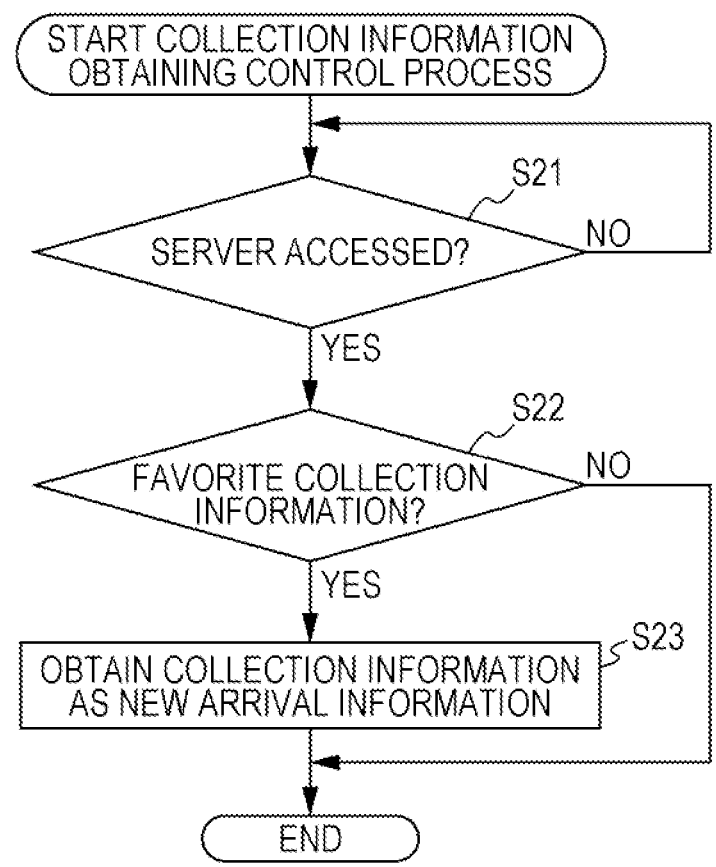
FIG. 12 is a flowchart illustrating a collection information obtaining control process.

Next, an example of a collection information obtaining control process performed by the user terminal will be described with reference to a flowchart illustrated in FIG. 12. In this embodiment, an example of a collection information obtaining control process performed by the smart phone 12 will be described.

In step S21, the collection information obtaining unit 251 shown in FIG. 10 determines whether the user terminal has accessed the management server 22 and waits until the user terminal accesses the management server 22.

When the determination is affirmative in step S21, the process proceeds to step S22.

In step S22, the collection information obtaining unit 251 determines whether the management server 22 has collection information corresponding to companies which belong to the favorite companies or the categories of favorite companies which are included in the registration information corresponding to the user ID.

When the determination is affirmative in step S22, the process proceeds to step S23.

In step S23, the collection information obtaining unit 251 obtains the collection information corresponding to companies which belong to the favorite companies or the categories of favorite companies as new arrival information.

Note that, in the process in step S22 and step S23, the case where the smart phone 12 selects and obtains collection information corresponding to companies which belong to the favorite companies and the categories of favorite companies has been described. However, the management server 22 may store the collection information which is associated with the user ID, for example, and the smart phone 12 may obtain the collection information corresponding to the user ID. Furthermore, the collection information obtained in step S23 may further include collection information selected in accordance with the user attributes of the collection information shown in FIG. 3.

The collection information obtaining control process is thus performed.

Figure 13:
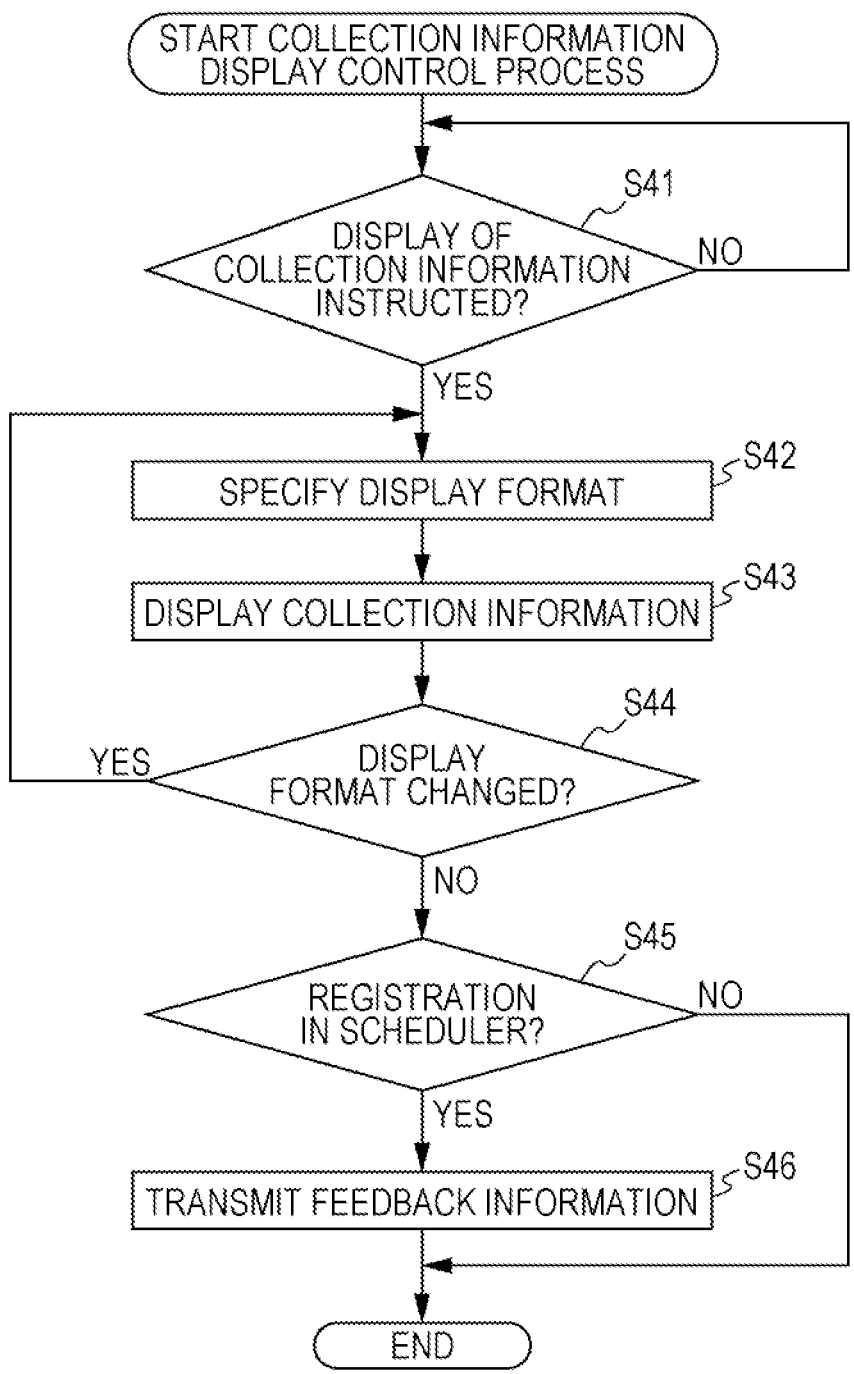
FIG. 13 is a flowchart illustrating a collection information display control process.

Next, an example of a collection information display control process performed by the user terminal will be described with reference to a flowchart illustrated in FIG. 13. In this embodiment, an example of a collection information display control process performed by the smart phone 12 will be described.

In step S41, the display format specifying unit 252 shown in FIG. 10 determines whether an instruction for displaying the collection information has been issued and waits until the determination becomes affirmative.

When the determination is affirmative in step S41, the process proceeds to step S42.

In step S42, the display format specifying unit 252 specifies a display format.

In this case, the display format specifying unit 252 determines a format used to display the collection information from among the formats shown in FIGS. 4, 6, 7, and 8 by a user's operation, for example.

In step S43, the display controller 253 displays the collection information in accordance with the display format specified in the process of step S42. By this, one of the images shown in FIGS. 4, 6, 7, and 8 is displayed in the display.

In step S44, the display format specifying unit 252 determines whether the display format has been changed. For example, when the user performs a predetermined operation, an instruction for changing the display format is issued and it is determined that the display format has been changed in step S44.

When the determination is affirmative in step S44, the process returns to step S42. Then an image is displayed in accordance with a new display format.

On the other hand, when the determination is negative in step S44, the process proceeds to step S45.

In step S45, the feedback controller 254 determines whether the collection information has been utilized (for example, whether the collection information has been registered in the scheduler).

When the determination is affirmative in step S45, the process proceeds to step S46.

In step S46, the feedback controller 254 transmits feedback information.

The collection information display control process is thus performed.

In the foregoing description, the user terminal obtains the collection information from the management server 22 through communication using the network 20. However, the collection information may be obtained in other methods.

For example, the collection information may be obtained through communication utilizing an NFC (Near Field Communication) technique or may be obtained by receiving a file attached to an e-mail.

Alternatively, the collection information may be obtained by capturing and analyzing a 2D barcode such as a QR code by a camera incorporated in the user terminal.

Furthermore, in the foregoing description, the collection information is assigned to the company categories and the promotion categories before being delivered. However, the collection information may be assigned to other categories.

Note that the series of processes described above may be executed by hardware or software. When the series of processes described above is executed by software, programs of the software are installed in a computer incorporated in dedicated hardware or a general personal computer 700 shown in FIG. 14, for example, which is capable of executing various functions by installing various programs through a network or a recording medium.

Figure 14:
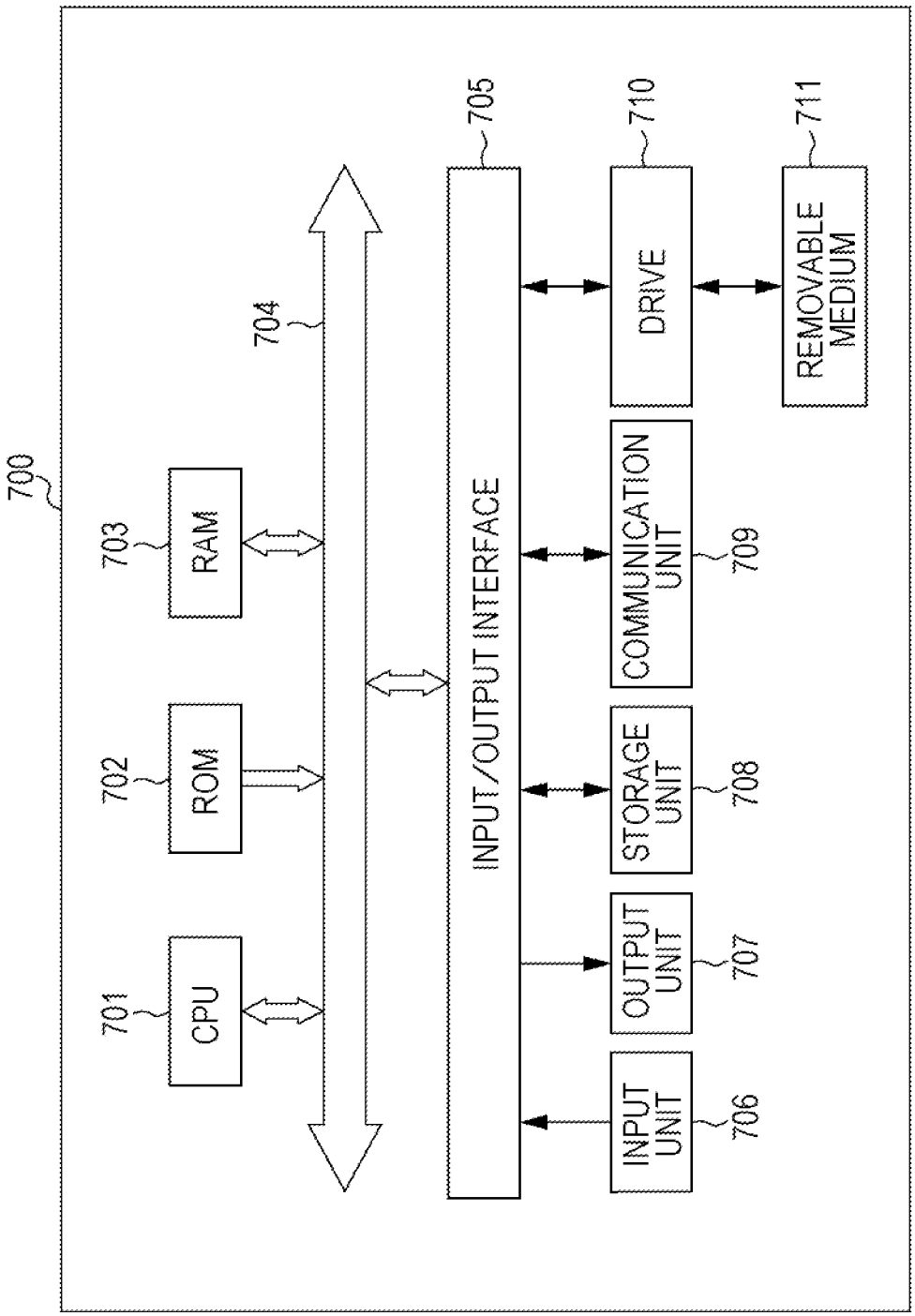
FIG. 14 is a block diagram illustrating a configuration of a personal computer.

In FIG. 14, a CPU 701 performs various processes in accordance with programs stored in a ROM 702 or programs loaded from a storage unit 708 into a RAM 703. The RAM 703 also stores data to be used by the CPU 701 for execution of the various processes where appropriate.

The CPU 701, the ROM 702, and the RAM 703 are connected to one another through a bus 704. To the bus 704, an input/output interface 705 is also connected.

To the input/output interface 705, an input unit 706 including a keyboard and a mouse, an output unit 707 including a display such as an LCD and a speaker, the storage unit 708 such as a hard disk, and a communication unit 709 including a modem and a network interface card such as a LAN card are connected. The communication unit 709 performs a communication process through a network including the Internet.

To the input/output interface 705, a drive 710 is also connected where appropriate. A removable medium 711 such as a magnetic disk, an optical disc, a magneto-optical disc, or a semiconductor memory is inserted into the drive 710 where appropriate, and a computer program read from the removable medium 711 is installed in the storage unit 708 where appropriate.

When the series of processes described above is executed by software, programs included in the software are installed from a network such as the Internet or a recording medium such as the removable medium 711.

Note that the recording medium includes not only the removable medium 711 such as a magnetic disk (including a floppy disk (registered trademark)), an optical disc (including a CD-ROM (Compact Disc-Read Only Memory), and a DVD (Digital Versatile Disk)), a magneto-optical disc (including MD (Mini-Disk) (registered trademark)), or a semiconductor memory which records the program therein and which is distributed to deliver the program to users independently from an apparatus body but also the ROM 702 recording the program therein or a hard disk included in the storage unit 708 which is distributed to users in a state in which the ROM 702 or the hard disk is incorporated in the apparatus body in advance.

Note that the series of processes described above in this specification may be performed in order of the description in a time-series manner, may be performed in parallel, or may be individually performed.

Furthermore, embodiments of the present technique are not limited to the foregoing embodiment and various modifications may be made without departing from the scope of the present technique.

Note that the present technique may be configured as below.

(1) An information processing apparatus, including a collection information obtaining unit configured to collect information stored in a plurality of apparatuses so as to obtain collection information assigned to predetermined category groups, and a display controller configured to control display of the collection information, wherein the category groups include first and second category groups, and the display controller controls display of an image including a first category group display region which displays categories of the first category group, a second category group display region which displays categories of the second category group, and a content display region which displays concrete content of the collection information which corresponds to one of the categories selected in the first category group and which corresponds to one of the categories selected in the second category group.

(2) The information processing apparatus according to (1), wherein a mark specifying the selected category in the first category group and a mark specifying the selected category in the second category group are included in the image displayed by the display controller.

(3) The information processing apparatus according to (1) or (2), wherein the collection information includes information representing a location, and the display controller further controls display of an image including a category display region which displays the categories of the first category group or the categories of the second category group, a geographic range display region which displays a geographic range associated with the information on the location included in the collection information, a map display region which displays a map which clearly specifies a position corresponding to the information on the location included in the collection information in the geographic range, and a location oriented content display region which displays concrete content of the collection information which corresponds to the selected category in the first category group or the second category group and which corresponds to the location clearly specified in the map.

(4) The information processing apparatus according to any one of (1) to (3), wherein the collection information includes information representing a time, and the display controller controls display of an image including a category display region which displays the categories of the first category group or the categories of the second category group, a time range display region which displays a time range associated with the information on the time included in the collection information, and a time oriented content display region which displays concrete content of the collection information which corresponds to the selected category in the first category group or the second category group and which includes the information on the time included in the time range.

(5) The information processing apparatus according to any one of (1) to (4), wherein the content display region displays concrete content of a plurality of collection information items, and when one of the plurality of collection information items displayed in the content display region is selected, the display controller further displays detail of the selected collection information item.

(6) The information processing apparatus according to (5), wherein the detail of the collection information item includes information specifying an apparatus of a transmission source of the collection information item.

(7) The information processing apparatus according to any one of (1) to (6), wherein the content display region displays concrete content of a plurality of collection information items, and GUIs used to display functions of utilizing the collection information items are displayed with the concrete content of the plurality of collection information items.

(8) The information processing apparatus according to (7), wherein, when one of the GUIs is operated, a corresponding one of the collection information items in which the concrete content is being displayed with the GUI is registered in a scheduler.

(9) The information processing apparatus according to (7), wherein when one of the GUIs is operated, a corresponding one of the collection information items in which the concrete content is being displayed with the GUI is posted to social media.

(10) The information processing apparatus according to (7), wherein, when one of the GUIs is operated, information specifying content of the operation and feedback information including information specifying a user of the information processing apparatus are transmitted through a network.

(11) The information processing apparatus according to any one of (1) to (10), wherein the collection information includes information representing user attributes, the collection information obtaining unit further obtains collection information selected in accordance with the attributes, and the display controller further controls display of an image including a region which displays the collection information selected in accordance with the attributes.

(12) The information processing apparatus according to any one of (1) to (11), wherein the display controller further controls display of an image including a region which displays information associated with collection information obtained by information processing apparatuses of other users.

(13) The information processing apparatus according to any one of (1) to (12), wherein the collection information is categorized according to transmission sources in the first category group, and the collection information is categorized according to content of the collection information in the second category group.

(14) An information processing method, including collecting information stored in a plurality of apparatuses so as to obtain collection information assigned to predetermined category groups, and controlling display of the collection information, wherein the category groups include first and second category groups, and display of an image including a first category group display region which displays categories of the first category group, a second category group display region which displays categories of the second category group, and a content display region which displays concrete content of the collection information which corresponds to one of the categories selected in the first category group and which corresponds to one of the categories selected in the second category group is controlled.

(15) A recording medium which records a program causing a computer to function as an information processing apparatus, the information processing apparatus including a collection information obtaining unit configured to collect information stored in a plurality of apparatuses so as to obtain collection information assigned to predetermined category groups, and a display controller configured to control display of the collection information, wherein the category groups include first and second category groups, and the display controller controls display of an image including a first category group display region which displays categories of the first category group, a second category group display region which displays categories of the second category group, and a content display region which displays concrete content of the collection information which corresponds to one of the categories selected in the first category group and which corresponds to one of the categories selected in the second category group.

(16) An information management apparatus, including a collection information generation unit configured to generate collection information which is to be transmitted to a plurality of user terminals, which is obtained by collecting information stored in a plurality of apparatuses, and which is assigned to predetermined first and second category groups, and a transmission unit configured to transmit the collection information to the user terminals in accordance with information specifying categories of the first category group and categories of the second category group which are associated with user IDs used to specify users of the user terminals.

(17) An information management method, including generating collection information which is to be transmitted to a plurality of user terminals, which is obtained by collecting information stored in a plurality of apparatuses, and which is assigned to predetermined first and second category groups, and transmitting the collection information to the user terminals in accordance with information specifying categories of the first category group and categories of the second category group which are associated with user IDs used to specify users of the user terminals.

(18) A recording medium which records a program causing a computer to function as an information processing apparatus, the information processing apparatus including a collection information generation unit configured to generate collection information which is to be transmitted to a plurality of user terminals, which is obtained by collecting information stored in a plurality of apparatuses, and which is assigned to predetermined first and second category groups, and a transmission unit configured to transmit the collection information to the user terminals in accordance with information specifying categories of the first category group and categories of the second category group which are associated with user IDs used to specify users of the user terminals.

(19) An information processing system including an information management apparatus and a user terminal, wherein the information management apparatus includes a collection information generation unit configured to generate collection information which is to be transmitted to a plurality of user terminals, which is obtained by collecting information stored in a plurality of apparatuses, and which is assigned to predetermined first and second category groups, and a transmission unit configured to transmit the collection information to the user terminals in accordance with information specifying categories of the first category group and categories of the second category group which are associated with user IDs used to specify users of the user terminals, the user terminal includes a collection information obtaining unit configured to collect information stored in a plurality of apparatuses so as to obtain collection information assigned to predetermined category groups, and a display controller configured to control display of the collection information, the category groups include first and second category groups, and the display controller controls display of an image including a first category display region which displays categories of the first category group, a second category display region which displays categories of the second category group, and a content display region which displays concrete content of the collection information which corresponds to one of the categories selected in the first category group and which corresponds to one of the categories selected in the second category group.

What is claimed is:

1. An information processing apparatus, comprising:
a processing device configured to operate as
a collection information obtaining unit to collect information stored in a plurality of apparatuses so as to obtain collection information assigned to predetermined category groups; and
a display controller to control display of the collection information,
wherein the category groups include first and second category groups, and
the display controller controls display of an image including
a first category group display region which displays categories of the first category group,
a second category group display region which displays categories of the second category group, and
a content display region which displays concrete content of the collection information which corresponds to one of the categories selected in the first category group and which corresponds to one of the categories selected in the second category group,
wherein the collection information includes information representing a location, and
the display controller further controls display of an image including
a category display region which displays the categories of the first category group or the categories of the second category group,
a geographic range display region which displays a geographic range associated with the information on the location included in the collection information,
a map display region which displays a map which clearly specifies a position corresponding to the information on the location included in the collection information in the geographic range, and
a location oriented content display region which displays concrete content of the collection information which corresponds to the selected category in the first category group or the second category group and which corresponds to the location clearly specified in the map.

2. The information processing apparatus according to claim 1,
wherein a mark specifying the selected category in the first category group and a mark specifying the selected category in the second category group are included in the image displayed by the display controller.

3. The information processing apparatus according to claim 1,
wherein the content display region displays concrete content of a plurality of collection information items, and
when one of the plurality of collection information items displayed in the content display region is selected, the display controller further displays detail of the selected collection information item.

4. The information processing apparatus according to claim 3,
wherein the detail of the collection information item includes information specifying an apparatus of a transmission source of the collection information item.

5. The information processing apparatus according to claim 1,
wherein the content display region displays concrete content of a plurality of collection information items, and
GUIs used to display functions of utilizing the collection information items are displayed with the concrete content of the plurality of collection information items.

6. The information processing apparatus according to claim 5,
wherein, when one of the GUIs is operated, a corresponding one of the collection information items in which the concrete content is being displayed with the GUI is registered in a scheduler.

7. The information processing apparatus according to claim 5,
wherein when one of the GUIs is operated, a corresponding one of the collection information items in which the concrete content is being displayed with the GUI is posted to social media.

8. The information processing apparatus according to claim 5,
wherein, when one of the GUIs is operated, information specifying content of the operation and feedback information including information specifying a user of the information processing apparatus are transmitted through a network.

9. The information processing apparatus according to claim 1,
wherein the collection information includes information representing user attributes,
the collection information obtaining unit further obtains collection information selected in accordance with the attributes, and
the display controller further controls display of an image including a region which displays the collection information selected in accordance with the attributes.

10. The information processing apparatus according to claim 1,
wherein the display controller further controls display of an image including a region which displays information associated with collection information obtained by information processing apparatuses of other users.

11. The information processing apparatus according to claim 1,
wherein the collection information is categorized according to transmission sources in the first category group, and
the collection information is categorized according to content of the collection information in the second category group.

12. An information processing apparatus, comprising:
a processing device configured to operate as
a collection information obtaining unit configured to collect information stored in a plurality of apparatuses so as to obtain collection information assigned to predetermined category groups; and
a display controller configured to control display of the collection information,
wherein the category groups include first and second category groups, and
the display controller controls display of an image including
a first category group display region which displays categories of the first category group,
a second category group display region which displays categories of the second category group, and
a content display region which displays concrete content of the collection information which corresponds to one of the categories selected in the first category group and which corresponds to one of the categories selected in the second category group,
wherein the collection information includes information representing a time, and
the display controller further controls display of an image including
a category display region which displays the categories of the first category group or the categories of the second category group,
a time range display region which displays a time range associated with the information on the time included in the collection information, and
a time oriented content display region which displays concrete content of the collection information which corresponds to the selected category in the first category group or the second category group and which includes the information on the time included in the time range.

13. The information processing apparatus according to claim 12,
wherein a mark specifying the selected category in the first category group and a mark specifying the selected category in the second category group are included in the image displayed by the display controller.

14. The information processing apparatus according to claim 12,
wherein the content display region displays concrete content of a plurality of collection information items, and
when one of the plurality of collection information items displayed in the content display region is selected, the display controller further displays detail of the selected collection information item.

15. The information processing apparatus according to claim 14,
wherein the detail of the collection information item includes information specifying an apparatus of a transmission source of the collection information item.

16. The information processing apparatus according to claim 12,
wherein the content display region displays concrete content of a plurality of collection information items, and
GUIs used to display functions of utilizing the collection information items are displayed with the concrete content of the plurality of collection information items.

17. The information processing apparatus according to claim 16,
wherein, when one of the GUIs is operated, a corresponding one of the collection information items in which the concrete content is being displayed with the GUI is registered in a scheduler.

18. The information processing apparatus according to claim 16,
wherein when one of the GUIs is operated, a corresponding one of the collection information items in which the concrete content is being displayed with the GUI is posted to social media.

19. The information processing apparatus according to claim 16,
wherein, when one of the GUIs is operated, information specifying content of the operation and feedback information including information specifying a user of the information processing apparatus are transmitted through a network.

20. The information processing apparatus according to claim 12,
wherein the collection information includes information representing user attributes,
the collection information obtaining unit further obtains collection information selected in accordance with the attributes, and
the display controller further controls display of an image including a region which displays the collection information selected in accordance with the attributes.

21. The information processing apparatus according to claim 12, wherein the display controller further controls display of an image including a region which displays information associated with collection information obtained by information processing apparatuses of other users.

22. The information processing apparatus according to claim 12,
wherein the collection information is categorized according to transmission sources in the first category group, and
the collection information is categorized according to content of the collection information in the second category group.

23. An information processing method for use with an information processing apparatus having a processing device, said method comprising:
collecting information stored in a plurality of apparatuses so as to obtain collection information assigned to predetermined category groups;
controlling, by use of the processing device, display of the collection information;
wherein the category groups include first and second category groups,
controlling display of an image including
a first category group display region which displays categories of the first category group,
a second category group display region which displays categories of the second category group, and
a content display region which displays concrete content of the collection information which corresponds to one of the categories selected in the first category group and which corresponds to one of the categories selected in the second category group;
wherein the collection information includes information representing a location, and
controlling display of an image including
a category display region which displays the categories of the first category group or the categories of the second category group,
a geographic range display region which displays a geographic range associated with the information on the location included in the collection information,
a map display region which displays a map which clearly specifies a position corresponding to the information on the location included in the collection information in the geographic range, and
a location oriented content display region which displays concrete content of the collection information which corresponds to the selected category in the first category group or the second category group and which corresponds to the location clearly specified in the map.

24. A recording medium having a program recorded thereon which when executed causes a computer to function as an information processing apparatus, the information processing apparatus comprising:
a collection information obtaining unit configured to collect information stored in a plurality of apparatuses so as to obtain collection information assigned to predetermined category groups; and
a display controller configured to control display of the collection information,
wherein the category groups include first and second category groups, and
the display controller controls display of an image including
a first category group display region which displays categories of the first category group,
a second category group display region which displays categories of the second category group, and
a content display region which displays concrete content of the collection information which corresponds to one of the categories selected in the first category group and which corresponds to one of the categories selected in the second category group,
wherein the collection information includes information representing a location, and
the display controller further controls display of an image including
a category display region which displays the categories of the first category group or the categories of the second category group,
a geographic range display region which displays a geographic range associated with the information on the location included in the collection information,
a map display region which displays a map which clearly specifies a position corresponding to the information on the location included in the collection information in the geographic range, and
a location oriented content display region which displays concrete content of the collection information which corresponds to the selected category in the first category group or the second category group and which corresponds to the location clearly specified in the map.

25. An information processing system including an information management apparatus and a user terminal,
wherein the information management apparatus includes
a collection information generation unit configured to generate collection information which is to be transmitted to a plurality of user terminals, which is obtained by collecting information stored in a plurality of apparatuses, and which is assigned to predetermined first and second category groups, and
a transmission unit configured to transmit the collection information to the user terminals in accordance with information specifying categories of the first category group and categories of the second category group which are associated with user IDs used to specify users of the user terminals,
the user terminal includes
a processing device configured to operate as
a collection information obtaining unit to collect information stored in a plurality of apparatuses so as to obtain collection information assigned to predetermined category groups, and
a display controller to control display of the collection information,
the category groups include first and second category groups, and
the display controller controls display of an image including
a first category display region which displays categories of the first category group,
a second category display region which displays categories of the second category group, and
a content display region which displays concrete content of the collection information which corresponds to one of the categories selected in the first category group and which corresponds to one of the categories selected in the second category group,
wherein the collection information includes information representing a location, and
the display controller further controls display of an image including a category display region which displays the categories of the first category group or the categories of the second category group, a geographic range display region which displays a geographic range associated with the information on the location included in the collection information, a map display region which displays a map which clearly specifies a position corresponding to the information on the location included in the collection information in the geographic range, and a location oriented content display region which displays concrete content of the collection information which corresponds to the selected category in the first category group or the second category group and which corresponds to the location clearly specified in the map.

26. An information processing method, comprising:

collecting information stored in a plurality of apparatuses so as to obtain collection information assigned to predetermined category groups;

controlling display of the collection information;

wherein the category groups include first and second category groups, controlling display of an image including a first category group display region which displays categories of the first category group, a second category group display region which displays categories of the second category group, and a content display region which displays concrete content of the collection information which corresponds to one of the categories selected in the first category group and which corresponds to one of the categories selected in the second category group;

wherein the collection information includes information representing a time, and controlling display of an image including a category display region which displays the categories of the first category group or the categories of the second category group, a time range display region which displays a time range associated with the information on the time included in the collection information, and a time oriented content display region which displays concrete content of the collection information which corresponds to the selected category in the first category group or the second category group and which includes the information on the time included in the time range.

27. A recording medium having a program recorded thereon which when executed causes a computer to function as an information processing apparatus, the information processing apparatus comprising:

a collection information obtaining unit configured to collect information stored in a plurality of apparatuses so as to obtain collection information assigned to predetermined category groups; and a display controller configured to control display of the collection information, wherein the category groups include first and second category groups, and the display controller controls display of an image including a first category group display region which displays categories of the first category group, a second category group display region which displays categories of the second category group, and a content display region which displays concrete content of the collection information which corresponds to one of the categories selected in the first category group and which corresponds to one of the categories selected in the second category group, wherein the collection information includes information representing a time, and the display controller further controls display of an image including a category display region which displays the categories of the first category group or the categories of the second category group, a time range display region which displays a time range associated with the information on the time included in the collection information, and a time oriented content display region which displays concrete content of the collection information which corresponds to the selected category in the first category group or the second category group and which includes the information on the time included in the time range.

28. An information processing system including an information management apparatus and a user terminal, wherein the information management apparatus includes a collection information generation unit configured to generate collection information which is to be transmitted to a plurality of user terminals, which is obtained by collecting information stored in a plurality of apparatuses, and which is assigned to predetermined first and second category groups, and a transmission unit configured to transmit the collection information to the user terminals in accordance with information specifying categories of the first category group and categories of the second category group which are associated with user IDs used to specify users of the user terminals, the user terminal includes a processing device configured to operate as a collection information obtaining unit to collect information stored in a plurality of apparatuses so as to obtain collection information assigned to predetermined category groups, and a display controller to control display of the collection information, the category groups include first and second category groups, and the display controller controls display of an image including a first category display region which displays categories of the first category group, a second category display region which displays categories of the second category group, and a content display region which displays concrete content of the collection information which corresponds to one of the categories selected in the first category group and which corresponds to one of the categories selected in the second category group, wherein the collection information includes information representing a time, and the display controller further controls display of an image including a category display region which displays the categories of the first category group or the categories of the second category group, a time range display region which displays a time range associated with the information on the time included in the collection information, and a time oriented content display region which displays concrete content of the collection information which corresponds to the selected category in the first category group or the second category group and which includes the information on the time included in the time range.

* * * * *